United States Patent

Bright et al.

[11] Patent Number: 5,152,588
[45] Date of Patent: Oct. 6, 1992

[54] ANTI-LOCK BRAKING SYSTEM

[75] Inventors: James A. Bright, Dayton; David A. Stradling, Troy, both of Ohio

[73] Assignee: General Motors Corporation, Detroit, Mich.

[21] Appl. No.: 723,132

[22] Filed: Jun. 28, 1991

[51] Int. Cl.$^5$ ............................................... B60T 8/32
[52] U.S. Cl. .............................. 303/115 EC; 188/162; 303/DIG. 6; 303/119 R; 303/68; 303/113 SS
[58] Field of Search .... 303/115 EC, 115 R, 115 VM, 303/115 FW, 119 R, 119 SV, DIG. 5, DIG. 6, 113 TR, 100, 110, 93, 61, 68, 69, 92, 113 SS; 364/426.02, 426.03; 180/197; 188/181 A, 181 R, 162

[56] References Cited

U.S. PATENT DOCUMENTS

| | | | |
|---|---|---|---|
| 3,684,328 | 8/1972 | Koivunen | 303/115 R |
| 3,731,980 | 5/1973 | Fink et al. | 303/DIG. 5 |
| 3,927,914 | 12/1975 | Fink et al. | 303/DIG. 5 |
| 4,099,793 | 7/1978 | Iio | 303/68 X |
| 4,453,782 | 6/1984 | Arikawa et al. | 303/68 X |
| 4,768,841 | 9/1988 | Watanabe | 303/113 SS |
| 4,803,840 | 2/1989 | Seibert et al. | 303/113 SS |
| 4,927,212 | 5/1990 | Harrison et al. | |
| 4,938,543 | 7/1990 | Parker et al. | 303/100 |
| 5,011,237 | 4/1991 | Matouka et al. | 303/115 EC |
| 5,015,040 | 5/1991 | Lin | 303/113 TR |
| 5,026,125 | 6/1991 | Matouka et al. | 303/100 |
| 5,029,950 | 7/1991 | Vennemeyer et al. | 303/115 EC |
| 5,042,885 | 8/1991 | Villee | 303/115 EC |

Primary Examiner—Douglas C. Butler
Attorney, Agent, or Firm—Ernest E. Helms

[57] ABSTRACT

An anti-lock braking system (ABS) for a vehicle is provided which in a preferred embodiment includes a controller for signalling the system to an ABS mode, a master cylinder for supplying fluid, an actuator having a bore with a first port connecting the bore with the master cylinder and a second port spaced from the first port connecting the bore with a brake, a first check valve separating the bore into a first chamber exposed to the first port and a second chamber exposed to the second port, and an orifice restricting flow between the brake and the master cylinder via the first and second chambers. A piston is mounted in the second chamber, the piston in a fully actuated position open the first check valve. A threaded driver translates the piston and is powered by a motor. A parallel path connects the master cylinder with the brake parallel to the first and second chambers of the actuator. A solenoid valve within the parallel path is governed by the controller for isolating the master cylinder from the brake when the system is in an ABS mode of operation. A second check valve allows fluid flow from the brake to the master cylinder when pressure within the master cylinder is lower than pressure within the brake.

4 Claims, 2 Drawing Sheets

ANTI-LOCK BRAKING SYSTEM

FIELD OF THE PRESENT INVENTION

The field of the present invention is that of anti-lock braking systems (ABS) for automotive vehicles.

DISCLOSURE STATEMENT

Anti-lock braking systems typically modulate the pressure delivered to a vehicle wheel brake(s) to prevent the vehicle wheel(s) from locking up in the braking condition. Two prior anti-lock braking systems are shown in commonly assigned U.S. Pat. Nos. 5,000,523 Mikhaeil-Boules et al and 5,011,237 Matouka et al, the disclosures of which are incorporated herein.

SUMMARY OF THE INVENTION

The present invention covers an improvement to the ABS system described in the aforementioned disclosures.

Other objects and advantages of the present invention can become more apparent to those skilled in the art as the nature of the invention is better understood from the accompanying drawings and a detailed description.

DETAILED DESCRIPTION OF THE DRAWINGS

Figure 1:
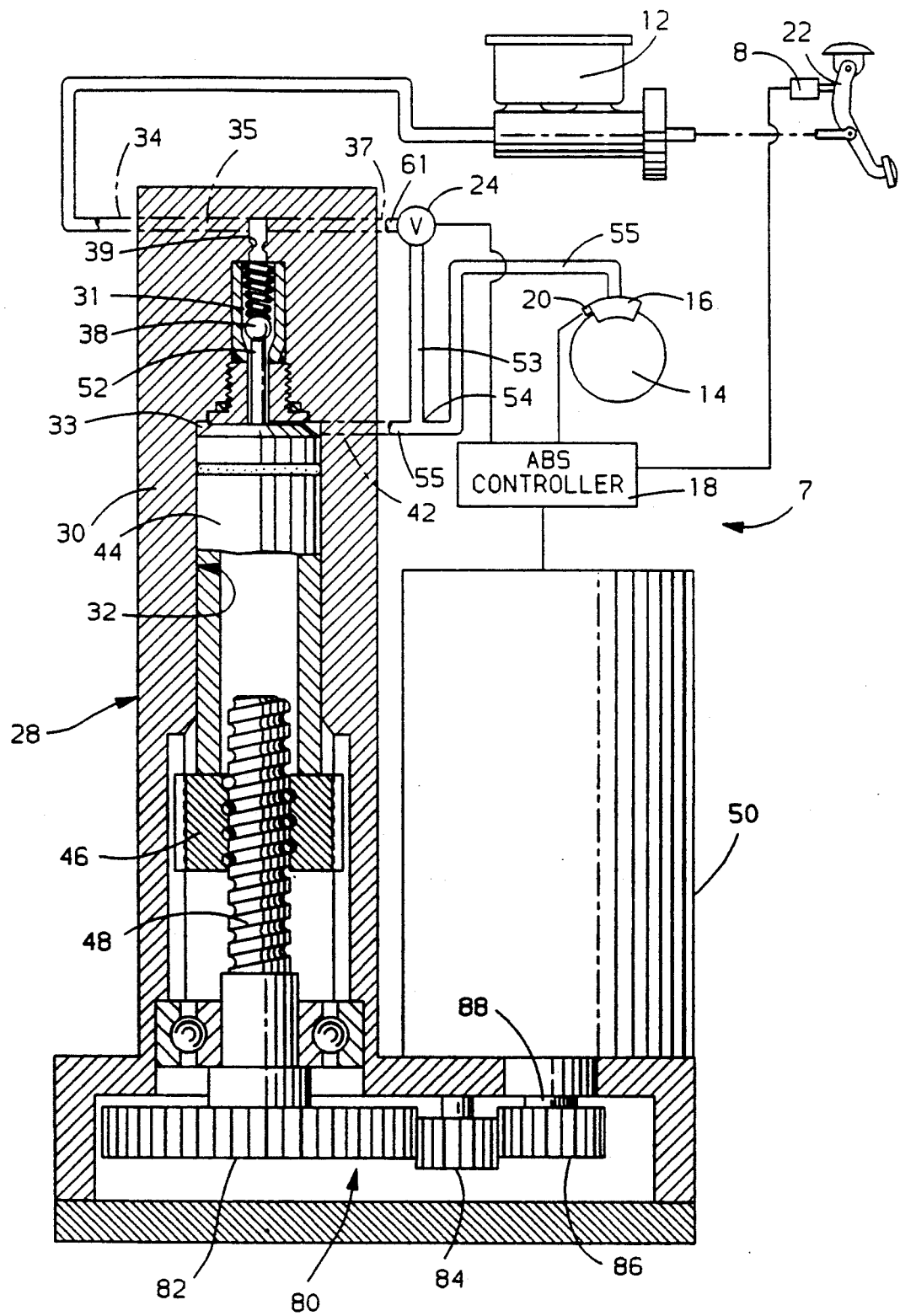
FIG. 1 is a schematic view shown partially in section of a preferred embodiment of the present invention for a vehicle wheel braking system.

The vehicle wheel anti-lock braking system 7 of the present invention includes a master cylinder 12 for supplying pressurized fluid. Connected on the wheel 14 and schematically shown, is a fluid activated wheel brake cylinder 16 (hereinafter referred to as a wheel brake) which receives pressurized fluid from the master cylinder for restraining rotational movement of the wheel 14. The wheel brake 16 may be utilized in a conventional drum or disc type vehicle brake.

An ABS electronic controller 18 is also provided. A sensor 20 in the vicinity of the vehicle wheel brake 16, determines the wheel 14 rotational speed and a switch 8 determines whether or not the brake pedal 22 of the vehicle is in a released position. The sensor 20 and the switch 8 feed information to the ABS controller 18. The ABS controller 18 will be cognizant of the rotational condition of the wheel and will provide an appropriate signal in response thereto. The signal will place the brake system 7 in an ABS mode of operation if the condition of the wheel 14 is within preset parameters.

A normally open solenoid valve 24, when activated to a closed position in response to a signal given by the controller 18, functions as an isolation valve to prevent fluid communication between the master cylinder 12 and the wheel brake 16. An actuator 28 is provided having an actuator frame 30 with a multi-diametered longitudinal bore 32. An actuator can be provided for each wheel brake of the vehicle or if desired, a plurality of wheel brakes can be connected to a single actuator.

The longitudinal bore 32 has a first port 34 which provides fluid commmunication from the master cylinder 12. Port 34 connects with a transverse bore 35. The transverse bore 35 intersects with the longitudinal bore 32 and with a third port 37. The third port 37 is connected with the solenoid valve 24 via line 61. From the solenoid valve 24 fluid from the master cylinder then can flow to a T-connection 54 to a line 55 leading to the brake cylinder 16. Additionally, the longitudinal bore 32 has a second fluid port 42 connecting with the line 55 which allows fluid communication with the wheel brake 16. The second port 42 is spaced from the first port 34.

Juxaposed between the ports 34/42 within the longitudinal bore 32 is a first check valve 38. The first check valve 38 divides the longitudinal bore 32 into a first 31 and second 33 chambers, the first chamber 31 being fluidly exposed to the first port 34 and the second chamber 33 being fluidly exposed to the second port 42.

Located somewhere between the first port 34 and the second port 42 is a fluid resistor orifice 39.

As shown the solenoid valve 24 is connected with the master cylinder 12 downstream of the first chamber 31 fluid connection with the master cylinder 12, however, in an alternative embodiment (not shown) the solenoid valve could be joined to the line leading from the master cylinder before the first port 34 and the opposite end of the solenoid could then be joined to a transverse bore which would intersect with the second chamber 33 of the longitudinal bore 32 and the second port 42. In such configuration the T-connection 54 and the third port 37 would be eliminated.

The piston 44 is slidably and sealably mounted within the longitudinal bore 32. Movement of the piston 44 provides a variable control volume in communication with the wheel brake 16, thereby modulating the pressure therein. A nut 46 operatively associated with piston 44 is connected with the piston 44 and the nut 46 is slidably mounted within the longitudinal bore 32 in a non-rotative fashion.

A power screw 48 projects into the nut and is threadably engaged therewith in an efficient manner. The power screw has a fixed rotational axis with respect to the actuator frame 30. Powering the power screw is a reversible DC motor 50 which is responsive to the signals given to it by the controller 18. In the position shown, for normal braking operation, the piston 44 is held at the extreme up position and must be held within a tolerance of 3/100 of an inch to maintain the check valve 38 in the open position via the rod 52 (tolerance shown in FIG. 1 greatly enlarged for purposes of illustration).

The power screw 48 is connected to a gear train 80 which is in turn connected also with the motor 50. The power screw is mounted by bearings and has a end large gear 82 connected to the end thereto. The large gear 82 meshes with an optional idler gear 84 which in turn meshes with a smaller pinion gear 86. The pinion gear 86 axially floats on a rotor shaft 88 of the motor and is held on by a spring clip (not shown).

In operation, when the vehicle operator activates the brake the switch 8 will signal to the ABS controller 18 that the brake is not in its release position. In normal vehicle braking operation the master cylinder will supply fluid to the port 34. The majority of the fluid will then flow through the line 35 out through the port 37 into the line 61 to the solenoid valve 24. Solenoid valve 24 in its normal position is open therefore fluid from the line 61 will freely flow to the line 53 which is connected with the underside of the solenoid valve 24. Fluid will then flow to the T-connection 54 into line 55 and then to the wheel brake 16. Additionally, some flow will proceed past the fluid restrictor 39 into the first chamber 31 past the check valve 38 which is held up by a rod 52 on the piston 44. The flow through the chamber 31 will exit out the port 42 to the line 55 into the wheel brake. Although the solenoid valve 24 is configured to only fail in an open position for an added degree of safety any closure of solenoid valve 24 or lines 61 or 54 would still not prevent operation of the brakes since fluid may flow from the master cylinder 12 past the check valve 38 for normal base brake apply.

If an ABS condition is realized by the controller 18, the motor 50 will be signalled to operate the drive train 80 in such a manner that the drive screw 48 will be rotated to retract the piston 44. The above action will cause the check valve 38 to seat sealing off the master cylinder 12 from the wheel brake 16 via the second longitudinal chamber 33. Additionally, the solenoid valve 24 will be activated by the ABS controller 18 to a closed positioned to isolate the master cylinder 12 from the wheel brake 16 in the path parallel to the first and second chambers 31,33.

Typically, during an ABS controlled stop there will be a pressure reapply after the initial release of pressure caused by the retraction of piston 44. The pressure reapply cycle will typically be less than the initial brake pressure that was experienced when the controller signalled the system 7 into an ABS condition therefore the rod 52 will not re-engage the check valve 38.

The controller will usually run the system through several cycles until the controller is cognizant that the rotational condition of the wheel has returned to a condition having parameters outside the ABS parameters and therefore the motor will then return the piston 44 to its fully extended position and the solenoid valve 24 will be signalled to the open position (when the brake pedal 22 is released and the switch 8 is tripped). Thereafter, normal brake apply operation of the system will again occur.

In certain situations especially when the system goes into an ABS condition when the vehicle encounters ice often the wheel will again reemerge on a surface having more friction such as a stretch of road with snow covering or dry pavement. When the braking system is first signalled into an ABS condition when the wheel 14 is on ice, the pressure within the braking system 7 will be relatively low. When the wheel 14 reemerges on pavement which is just partially snow covered, even though the wheel may still be within parameters which are ideally covered in an ABS mode; there is a need to increase the fluid within the longitudinal bore second chamber 33, the line 55 and the wheel brake 16. To accomplish the above task the piston 44 is signalled by the controller extending to such an extreme extent that the rod 52 opens the first check valve 38. Since the vehicle operator still has his foot on the brake pedal 22, additional fluid from the master cylinder 12 will augment the fluid already exposed to the wheel brake 16. The above mentioned additional fluid is often referred to as augmentation flow since it is additional fluid added to the control volume exposed to the wheel brake after the ABS controller 18 has signalled the braking system to an ABS condition. (During this period of time the solenoid valve 24 still remains in its closed position.)

It has been found preferable from fluid dynamics standpoint to limit the flow rate of the augmentation flow. To accomplish the above noted limitation is the function of the flow restrictor 39 which limits the flow rate of the augmentation flow so that the wheel brake 16 does not experience too rapid a rise in brake apply pressure during augmentation flow.

It has been found desirable from a braking system operations standpoint to limit the pressure within the wheel brake 6 during ABS actuation to a pressure equal or less than that of the vehicle brake master cylinder 12 since the pressure within the master cylinder 12 is a reflection of the desire of the vehicle operator by virtue of the force he is exerting upon the brake pedal 22. Therefore, if the pressure in the wheel cylinder 16 exceeds that within the master cylinder 12 fluid will be allowed to flow back into the master cylinder 12. To accomplish the above, even when the piston 44 is in a retracted position and the rod 52 is not contacting with the check valve 38, the pressure within the braking system exposed to the wheel brake 16 will lift the check valve 38 and allow fluid flow back to the master cylinder 12.

A similar situation occurs when the vehicle operator removes his foot from the brake pedal 22 indicating a desiring for a termination of braking operation. The pressure within the master cylinder 12 will be relieved almost instantaneously removal of the operator's foot from the brake pedal 22, however, the pressure within the wheel brake 16 will still be a reflection of that desired by the ABS controller for a brief moment of time (assuming the braking system 7 was previously in an ABS mode). The solenoid valve 24 will not be signalled to an opened position by the controller 18 until the brake pedal has moved all the way back to activate the switch 8. Therefore, while the brake pedal 22 is travelling to the totally released position reverse flow will occur past the check valve 38. The reverse flow past the check valve 38 will be restricted by the restrictor orifice 39. It has been found to be desirable to increase the reverse flow from the wheel brake 16 to the master cylinder 12 beyond that which is allowable by the restrictor orifice 39. The restrictor orifice 39 and other embodiments can be provided by a plate at the beginning of the multi-diameter bore 32.

Figure 2:
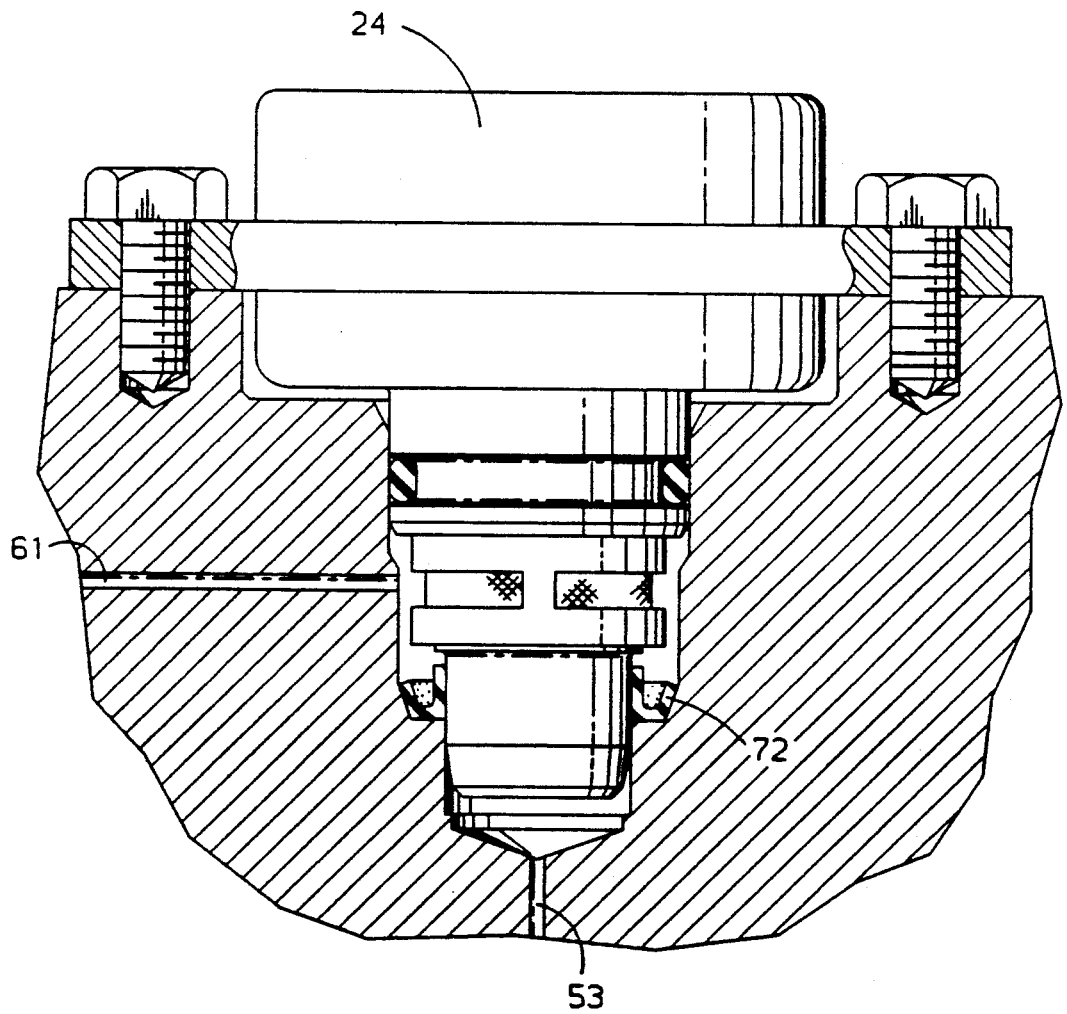
FIG. 2 is a partial sectional view illustrating details of the anti-lock braking system illustrated in FIG. 1.

To achieve such an ABS hydraulic circuit with enhanced reverse flow characteristics the present invention is brought forth. The present invention provides a second auxiliary check valve allowing fluid flow from the wheel brake 16 to the master cylinder 12. In a preferred embodiment as shown referring to FIG. 2, this check valve function is accomplished by the means of a lip seal 72 which surrounds the solenoid valve 24. The solenid valve is connected with lines 61 and 53. During normal base brake applied the pressure in the master cylinder will seal off the lip seal 72 and therefore fluid can only flow from line 61 to line 53 only through the solenoid valve 24. However, when pressure within the wheel brake 16 is greater than that within the master cylinder 12, the fluid within line 53 will be allowed to escape into line 61 via the lip seal 72. Therefore there will be a fluid circuit or flow path parallel to that of the longitudinal bore 32 to provide for more rapid relief of the wheel brake 16 when the vehicle operator relieve the master cylinder 12. The increase of reaction time in release of the pressure within the wheel brake 16 has significantly increased the vehicle operator's evaluation of the performance of the braking system 7. In another embodiment not shown a check valve integral to the solenoid valve can be utilized to allow the reverse flow.

While an embodiment of the present invention has been explained, it will be readily apparent to those skilled in the art of the various modifications which can be made to the present invention without departing from the spirit and scope of this application as it is encompassed by the following claims.

We claim:

1. An anti-lock braking system (ABS) for a brake of a wheel of a motor vehicle in combination comprising:

controller means cognizant of a condition of the wheel for signalling the system to an ABS mode of operation;

master cylinder means for supplying pressurized fluid to the wheel brake;

an actuator frame means having a longitudinal bore with a first port connecting the longitudinal bore with the master cylinder means and a second port spaced from the first port connecting the longitudinal bore with the wheel brake;

first check valve means separating the longitudinal bore into a first chamber exposed with the first port and a second chamber exposed to the second port;

orifice means restricting flow between the wheel brake and the master cylinder means via the first and second chambers of the longitudinal bore;

a piston sealably and slidably mounted within the second chamber, the piston in a fully actuated position contacting and opening the first check valve means;

threaded drive means operatively associated with the piston for translating the piston within the second chamber;

motor means torsionally associated with the drive means for powering the same, the motor means being governed by the controller means;

parallel path means fluidly connecting the master cylinder means with the wheel brake along a fluid circuit parallel to a fluid circuit taken from the master cylinder means to the wheel brake which passes through the first and second chambers of the longitudinal bore;

solenoid valve means connected within said parallel path means being governed by the controller means for isolating the master cylinder means from the wheel brake when the controller means signals the system to an ABS mode of operation; and second check valve means within the parallel path means allowing fluid flow from the wheel brake to the master cylinder means when pressure within the master cylinder means is lower than pressure within the wheel brake.

2. An ABS system as described in claim 1 wherein said controller means at an end of an actuation of the ABS system causes said piston to be extended to open the first check valve means.

3. An ABS system as described in claim 1 wherein a lip type seal surrounding a body of the solenoid valve means mounted within the parallel path means provides a check valve function of the second check valve means.

4. An ABS system as described in claim 1 further including switch means to determine when the master cylinder means is not being actuated so as to signal system out of the ABS mode of operation.

* * * * *